United States Patent

Awadalla et al.

[11] Patent Number: 5,304,233
[45] Date of Patent: Apr. 19, 1994

[54] RECOVERY OF PLATINUM GROUP METALS (PGM) FROM ACIDIC SOLUTIONS BY REDUCTION PRECIPITATION WITH SODIUM BOROHYDRIDE

[75] Inventors: Farouk T. Awadalla, Hull; Ronald E. Molnar, Ottawa; Gordon M. Riteey, Nepean, all of Canada

[73] Assignee: Her Majesty the Queen in right of Canada, as represented by the Minister of Energy, Mines and Resources, Canada

[21] Appl. No.: 647,988

[22] Filed: Jan. 30, 1991

[30] Foreign Application Priority Data
May 10, 1990 [CA] Canada ................. 2016492

[51] Int. Cl.$^5$ .............................. C22B 3/22
[52] U.S. Cl. ............................... 75/741
[58] Field of Search ............... 75/371, 741, 421, 426, 75/744; 423/22

[56] References Cited

U.S. PATENT DOCUMENTS
4,092,154 5/1978 Dietz, Jr. et al. .
4,096,316 6/1978 Tamai et al. ................. 148/105
4,319,923 3/1982 Falanga et al. .

FOREIGN PATENT DOCUMENTS
1197986 12/1985 Canada ................. 75/741
158828 12/1981 Japan ................... 75/741

Primary Examiner—Melvyn J. Andrews
Attorney, Agent, or Firm—Birch, Stewart, Kolasch & Birch

[57] ABSTRACT

A method is disclosed for the direct recovery of platinum group metals (PGM) from thiourea solutions or highly acidic aqueous solutions in general, such as leach solutions resulting from the acid leaching of precious metal bearing material. The method comprises reduction precipitation of the PGM from solution by alkali metal borohydride (preferably sodium or potassium borohydride) addition thereto at ambient temperature and pressure. The resulting precipitate is readily filtrable to give a product comprising high purity platinum group metal powder. The barren solution can be recycled to the upstream process.

26 Claims, 5 Drawing Sheets

FIG. 1

(100 ppm PGM, pH=1.0, RM. TEMP., 2 MIN. REACTION TIME)

FIG. 2

(100 ppm PGM, MOLAR RATIO (NaBH4/PGM)=1, FOR Pd, Rh, 2 FOR Pt, RM. TEMP., 2 MIN. REACTION TIME)

FIG. 3

(100 ppm PGM, pH=1, MOLAR RATIO NaBH4/PGM)=1 FOR Pd, Rh, 2 FOR Pt, RM. TEMP.)

FIG. 4

(pH=1, MOLAR RATIO (NaBH4/PGM)=1 FOR Pd, Rh, 2 FOR Pt, RM. TEMP., 2 MIN. REACTION TIME)

FIG. 5

(100 ppm PGM, pH=1, MOLAR RATIO (NaBH4/PGM)=1 FOR Pd, Rh, 2 FOR Pt, RM. TEMP., 2 MIN. REACTION TIME)

FIG. 6

(100 ppm Pt, 250 ppm Cu, MOLAR RATIO NaBH4/Pt=2, RM. TEMP., 2 MIN. REACTION TIME)

RECOVERY OF PLATINUM GROUP METALS (PGM) FROM ACIDIC SOLUTIONS BY REDUCTION PRECIPITATION WITH SODIUM BOROHYDRIDE

BACKGROUND OF THE INVENTION

This invention relates to a method for the recovery of platinum group metals (PGM) from thiourea solutions and acidic solutions in general, such as leach solutions resulting from the acid leaching of precious metal bearing material. More particularly, the invention relates to a method for the recovery of PGM from very highly acidic solutions of about 8N HCl and from thiourea strip liquors by reduction precipitation with alkali metal borohydride, preferably sodium or potassium borohydride.

DESCRIPTION OF RELATED ART

Several chemical methods have commonly been used to recover platinum group metals from leach solutions and other aqueous liquors. Typically, PGM bearing material is leached with concentrated hydrochloric acid (HCl) in the presence of oxidizing agents such as $Cl_2$, $H_2O_2$ or $HNO_3$. In certain instances in order to enhance leaching kinetics, the leaching is conducted under conditions of high pressure and temperature and in special reactors. The leach liquor is then treated directly to recover precious metals, or it may be concentrated, for example, by extraction with organic solvents followed by selective stripping to produce an enriched PGM stream. In one method the strip solution is neutralized to a pH of 4 and the PGM recovered by reduction precipitation with sodium formate at about 95° to 100° C. for about 1 to 2 hours. Cementation onto metallic zinc or iron can also be applied to produce a sponge which contains approximately 10% PGM.

Another method utilizes Amborane TM to reduce PGM onto the resin which is then subsequently combusted to recover the PGM. A further method of recovery is that of electrolysis.

Each of these prior methods suffers from one or more disadvantage. Certain methods require prior chemical modification of the PGM bearing solution. This results in an increased processing cost and precludes recyclability of the barren solutions. In some cases heat is required to effect the process while in other methods the recovered products are of low quality and low purity.

The need to adjust conditions such as pH, temperature, and reaction time and the lack of selectivity are distinct disadvantages of the known methods. For instance, electrolysis requires that the entire electrolyte be changed frequently and that the product be refined twice.

Amborane TM reductive resin is effective only at a pH greater than 2. It is unselective and requires combustion of the loaded resin to recover the PGM.

Cementation methods yield low quality and impure PGM product due to their incorporation of metallic powder into the desired product.

Reduction precipitation of PGM from solution with sodium formate requires the adjustment of solution pH to about 4.0. At a pH below 4, the rate of reaction is very slow. At a pH greater than 4, the rate of reaction is also reduced presumably due to the formation of fine precipitates of platinum and palladium hydroxides which affect the rate of filtration. Furthermore, these precipitates become contaminated as a result of the coprecipitation of impurities. Sodium formate also requires the application of heat in the range of about 95° to 100° C. which contributes significantly to the cost of the process.

Reduction with hydrogen gas requires the use of a special reactor. Reduction using $H_2O_2$ is in many cases not effective while reduction using hydrazine solution requires extraordinary handling procedures to cope with its inherent danger.

U.S. Pat. No. 4,319,923 (Falanga et al) teaches a method of recovering gold and/or palladium from spent iodide-iodine etching solution and regenerating the etching solution for reuse. The method comprises adjusting the spent iodide-containing solution to a pH of about 12.5 by the addition of an alkaline compound to precipitate gold, adding a borohydride such as potassium or sodium borohydride to the alkaline solution to precipitate palladium from solution, adjusting the spent solution to an acidic-to-neutral pH to convert potassium hypoiodite to iodine, readjusting the pH to about 9.0, removing the precipitate and, finally adding potassium iodide and/or iodine crystals to regenerate the original composition for reuse.

U.S. Pat. No. 4,092,154 (Dietz, Jr. et al) describes an aluminum-containing precipitating agent for precious metals (such as gold, silver and PGM) and a method for its use. The precipitating agent comprises aluminum powder, a reducing agent, such as sodium hydrosulfite, sodium borohydride or hydrazine, and, optionally, an alkali metal carbonate, such as potassium carbonate, as activator. The precipitating agent reduces the precious metal ions to elemental metal which settles and can then be separated from solution.

Stabilized sodium borohydride ($NaBH_4$) in the form of VenMet TM solution is presently being used to lower the valency of platinum during its leaching. However, sodium borohydride has not hitherto been used in the recovery of PGM from solution.

SUMMARY OF THE INVENTION

An object of this invention therefore is to provide a method of recovering platinum group metals from thiourea and other highly acidic solutions without the need for a chemical step prior to such recovery.

A further object of this invention is to provide a method of PGM recovery which is highly selective, is effected under ambient conditions and produces pure PGM powder in metallic form.

A still further object of this invention is to provide a method of PGM recovery from thiourea and other highly acidic solutions by reduction precipitation using a stabilized form of alkali metal borohydride, preferably sodium or potassium borohydride, wherein the barren solution is in a condition to allow its recycle to the upstream process.

Accordingly, the invention provides a method for the recovery of platinum group metals from thiourea and other highly acidic solutions by reduction precipitation using a stabilized form of alkali metal borohydride. The precipitated metallic powder is separated from solution by filtration rendering the barren solution recyclable to the upstream process.

DETAILED DESCRIPTION OF THE INVENTION

In a preferred embodiment, reduction precipitation is effected using a stabilized aqueous sodium borohydride solution containing about 12% NaBH₄ and from 10 to 50% NaOH, for example VenMet ™ solution (12% NaBH₄, 40% NaOH).

In another preferred embodiment, potassium borohydride may be used to effect reduction precipitation.

The use of sodium borohydride to directly recover PGM provides distinct advantages over current methods. Precipitation can be effected directly from solutions of a wide range of acidity (for example, from a highly acidic solution such as 8N HCl to near neutral solution) without the need for neutralization or other pH adjustment, effectively saving a process step and its associated operating cost. The use of sodium borohydride allows recovery of PGM without chemically modifying the PGM-bearing solution other than by the addition of the borohydride which is used in very small amounts. As no chemical modification of the solution occurs, and since the PGM precipitate is readily filtrable, the filtrate can be recycled directly to the upstream process. This provides definite advantages over prior art methods in terms of reduced plant effluents, reduced operating costs and improved plant water balance.

Reduction precipitation of PGM with alkali metal borohydride is effected at ambient temperature and pressure and begins instantaneously upon the addition of the alkali metal borohydride to the PGM-bearing solution. The reduction from acidic solutions is more selective than in alkaline solutions. Similarly, the reduction kinetics in acidic solutions are faster than in alkaline solutions.

A separation of the PGM from other base metal ions in solution such as copper, zinc and iron can be effected by correctly arranging the reduction process steps.

The process of recovering platinum group metals by alkali metal borohydride reduction also presents the following advantages: the reduction is simple, efficient and safe; no intermediate pH adjustment step is necessary; the reduction is selective, fast and can be conducted at ambient temperature and pressure; the PGM precipitate product is less contaminated than the product of other comparable methods; the amount of alkali metal borohydride used is small and any boron discharged in effluents as boric acid or borates is environmentally acceptable as boron represents an element vital to many life processes and is widely distributed in nature.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

The most common chloro-complexes of PGM in chloride media are $PtCl_6^{2-}$, $PtCl_4^{2-}$, $PdCl_4^{2-}$ and $RhCl_6^{3-}$. The standard potentials of these complexes in aqueous chloride media are as follows:

| | | | |
|---|---|---|---|
| $PtCl_4^{2-} + 2e^- ==$ | $Pt + 4Cl^-$ | +0.73 V | (1) |
| $PtCl_6^{2-} + 2e^- ==$ | $PtCl_4^{2-} \, 2Cl^-$ | +0.74 V | (2) |
| $PdCl_4^{2-} + 2e^- ==$ | $Pd + 4Cl^-$ | +0.62 V | (3) |
| $RhCl_6^{3-} + 3e^- ==$ | $Rh + 6Cl^-$ | +0.44 V | (4) |

Upon the addition of sodium borohydride in the form of VenMet ™ solution, an immediate drop in the potential of the solution was observed and fine black precipitates formed indicating a high efficiency of sodium borohydride in reducing PGM. The results are shown on Table 1.

TABLE 1
Decrease in PGM Chloro-complex Solution Potential with Metal Reduction by SBH
100 ppm PGM, pH = 1, room temperature, 2 min reaction time

| Metal | Molar Ratio (SBH/Metal) | Initial Potentials* (mV) | Final Potentials* (mV) | Recovery (%) |
|---|---|---|---|---|
| Pt | 2 | 520 | −121 | 95.6 |
| Pd | 1 | 403 | −285 | 99.1 |
| Rh | 1 | 424 | −270 | 99.8 |

*Redox potentials are measured vs SCE

The precipitates were separated from the barren solution by filtration, air dried and analyzed by X-ray diffraction. Analysis revealed the precipitates to be substantially pure platinum, palladium and rhodium.

Scanning electron microscopy (SEM) further revealed the particles to be very fine crystallites of submicron size substantially spherical in shape. The fine particles also appeared to be agglomerated in the size range of from about 30–100 micrometers.

Systematic studies were conducted on synthetic solutions of PGM in order to determine the optimum conditions for complete reduction. Parameters studied include pH, PGM concentration, stoichiometry, time, temperature and the solution matrix.

Sodium borohydride is a strong reducing agent in that it supplies eight electrons per mole to achieve reduction. The sodium borohydride reduction of PGM in a chloride medium can be represented by the following reactions:

$$2PtCl_6^{2-} + NaBH_4 + 2H_2O \longrightarrow \quad (5)$$

$$2Pt^\circ + NaBO_2 + 8HCl + 4Cl^-$$

$$4PtCl_4^{2-} + NaBH_4 + 2H_2O \longrightarrow \quad (6)$$

$$4Pt^\circ + NaBO_2 + 8HCl + 8Cl^-$$

$$4PdCl_4^{2-} + NaBH_4 + 2H_2O \longrightarrow \quad (7)$$

$$4Pd^\circ + NaBO_2 + 8HCl + 8Cl^-$$

-continued $$8/3RhCl_6^{3-} + NaBH_4 + 2H_2O \longrightarrow$$

$$8/3Rh° + NaBO_2 + 8HCl + 8Cl^-$$

Figure 1:
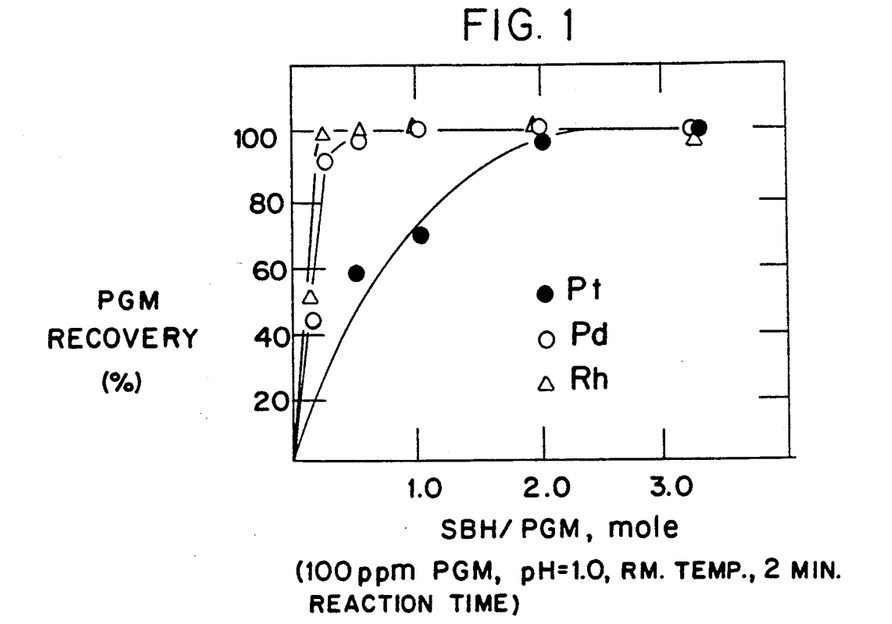
FIG. 1 shows the effect of NaBH₄/PGM molar ratio on the reduction of PGM from chloride solution.

As shown in reactions (5)–(8), one mole of sodium borohydride can reduce 2 moles of Pt(IV), 4 moles of Pt(II) or Pd(II) or 2.7 moles of Rh(III). With reference to FIG. 1, it can be seen that for Pd(II) and Rh(III) ions, the stoichiometric amount of sodium borohydride was enough to attain complete reduction. However, for platinum the quantity of sodium borohydride required was greater than the calculated stoichiometric amount assuming that all the platinum is present as Pt(II). This is consistent with a large fraction of the platinum being present in the tetravalent oxidation state which requires more sodium borohydride (Pt(IV)→Pt°=−1.47 V). The actual amount of sodium borohydride required to complete the reduction of PGM depends also on factors such as pH and PGM concentration.

Figure 2:
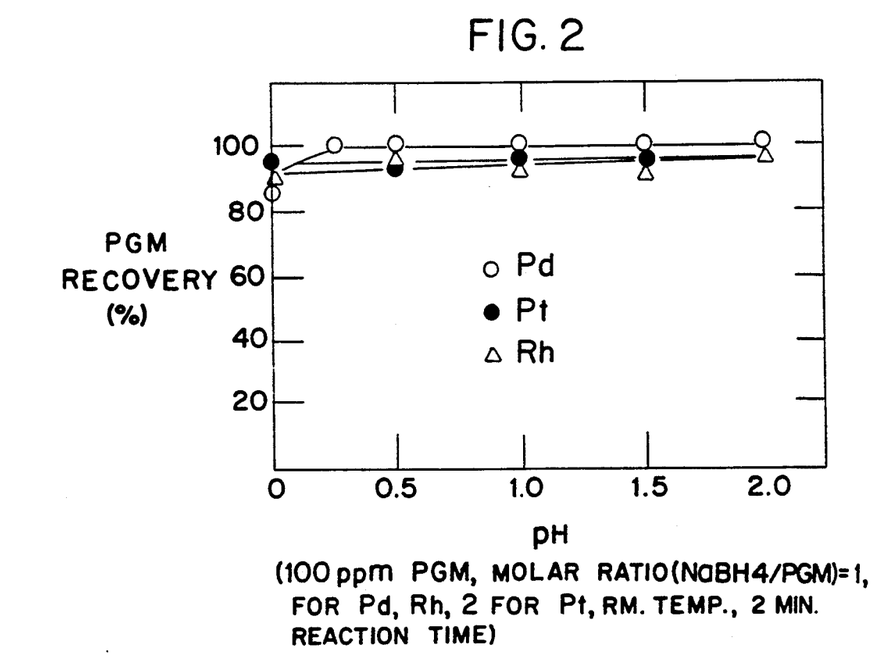
FIG. 2 shows the effect of initial pH on reduction of PGM chloro-complexes by sodium borohydride.

Sodium borohydride has been found effective for reducing PGM in highly acidic solutions. Referring now to FIG. 2, the effect of pH on the reduction efficiency of sodium borohydride can be seen. It is clear that the reduction efficiency of Rh and Pd is slightly reduced at pH=0. Increasing the acidity to 4M HCl did not substantially change the reduction efficiency for these metals. For Pt the reduction efficiency did not decrease when the pH was lowered to 0, but with 4M HCl it dropped to 68%. Reduction efficiency also depends on metal concentration. Increasing the concentration of the Pt ion (from 100 ppm to 1000 ppm Pt) at an acidity of 4M HCl resulted in an increase in reduction efficiency of 84.5%. Furthermore, when the amount of sodium borohydride added was increased (to a molar ratio of $NaBH_4/Pt=6$) platinum recovery increased to about 93.0%.

The reducing ability of sodium borohydride in highly acidic solutions of PGM may be explained by an autocatalytic mechanism (J. Halpren, "Homogenous Catalytic Activation of Molecular Hydrogen by Metal Ions and Complexes", J. Phys. Chem., 63, (1959), pp. 398–403.) whereby the reduced PGM (e.g. Pd) homolytically splits the hydrogen gas produced by $NaBH_4$ hydrolysis to form an active (H) which can then in turn reduce another chloro-complexed PGM. The reactions involved can be represented as follows:

$$2Pd + H_2 \rightarrow 2Pd(H) \quad (9)$$

$$Pd\,Cl_4^{2-} + 2Pd(H) \rightarrow 3\,Pd. + 2HCl + 2\,Cl \quad (10)$$

Figure 3:
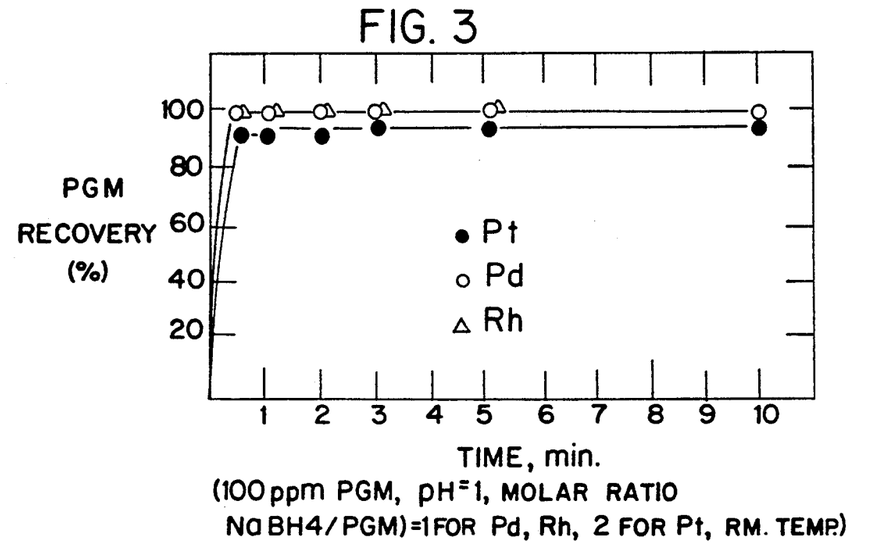
FIG. 3 shows PGM reduction kinetics with sodium borohydride.

The reduction of PGM by $NaBH_4$ is fast. As shown in FIG. 3, reaction is complete within one minute. The reduced products are stable for at least 12 hours.

Figure 4:
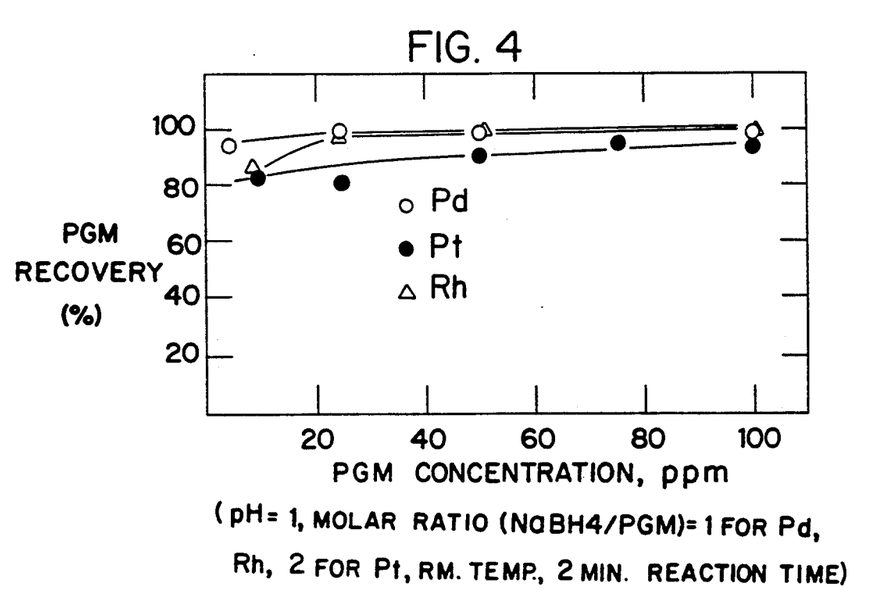
FIG. 4 shows the reduction with sodium borohydride of various concentrations of PGM chlorocomplexes.

Sodium borohydride reduction was effected over a wide range of PGM concentration (from 5 ppm to 1000 ppm). As shown in FIG. 4, reduction was most efficient at lower PGM concentrations. However, for concentrations below 25 ppm reduction efficiencies decreased slightly. This is likely the result of a decreased sodium borohydride/metal contact at lower concentrations. Increased contact times might be expected to improve the recovery, but a competing redissolution can take place with prolonged mixing as sodium borohydride decomposes.

The reduction of platinum was effected at varied reaction temperatures (from 25° C. to 60° C). It was found that increasing the temperature increased the reduction efficiency as shown in Table 2.

TABLE 2

Effect of Temperature on PGM Reduction
100 ppm PGM, pH = 1.0, molar ratio (SBH/metal) = 1, 2 min reaction time

| Temperature (°C.) | PGM Recovery (%) Pt |
|---|---|
| 25 | 69.0 |
| 35 | 74.0 |
| 50 | 90.0 |
| 60 | 95.0 |

In secondary PGM bearing materials such as automatic exhaust catalytic converters, other catalyst materials and metal scrap, the PGM are typically associated with contaminating metals. Accordingly, the effect of contaminating ions on the reduction of PGM by sodium borohydride was studied. Such contaminating ions included $Al^{3+}$, $Pb^{2+}$, $Cu^{2+}$ and $Zn^{2+}$.

The presence of $Al^{3+}$, $Zn^{2+}$ and $Pb^{2+}$ in the concentration range of 25–250 ppm in the PGM-containing feed solution was found to have no effect on PGM reduction efficiency or on the kinetics of the reduction reaction. Furthermore, solution analysis before and after the reduction revealed the product to be free of $Al^{3+}$ and $Zn^{2+}$. However, $Pb^{2+}$ appeared to coprecipitate with PGM as revealed in Table 3.

TABLE 3

Reduction of PGM Chloro-complexes in Presence of $Pb^{2+}$
100 ppm PGM, pH = 1, molar ratio (SBH/Metal) = 2 for Pt, 1 for Pd and Rh, room temperature, 2 min reaction time

| $Pb^{2+}$ Ion (ppm) | PGM Recovery (%) | | | Pb Coprecipitated* (ppm) | | |
|---|---|---|---|---|---|---|
| | Pt | Pd | Rh | Pt | Pd | Rh |
| 25 | 97.2 | 96.6 | 99.4 | 10.6 | all | 23.8 |
| 50 | 97.1 | 97.6 | 97.3 | 12.2 | 28.1 | 29.6 |
| 100 | 96.7 | 98.6 | 98.9 | 14.4 | 20.3 | 40.5 |
| 250 | 96.4 | 98.1 | 95.2 | 27.5 | 20.8 | 75.0 |

*Difference in solution concentration after reduction

Figure 5:
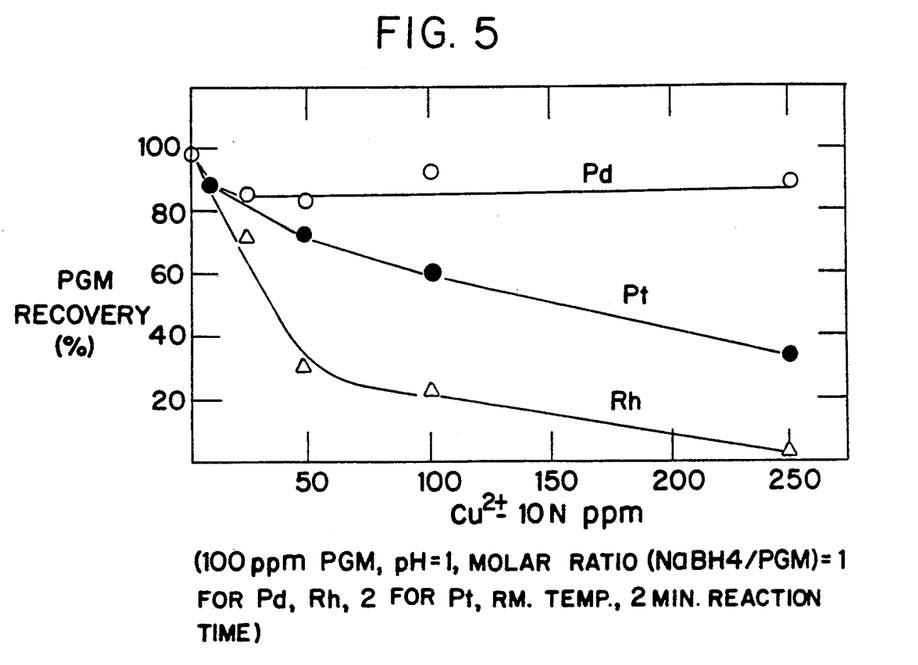
FIG. 5 shows the effect of copper on reduction of PGM chloro-complexes by sodium borohydride.

The presence of $Cu^{2+}$ ion in the solution matrix of PGM was found to have a negative effect on the recovery of PGM with sodium borohydride as shown in FIG. 5. The negative effect was most prominent with Rh, less so with Pt, and Pd was found to be the least sensitive to the presence of copper. The amount of copper which coprecipitated with the PGM is shown in Table 4.

TABLE 4

Copper Coprecipitated during PGM Chloro-complex Reduction
100 ppm PGM, pH = 1, molar ratio (SBH/Metal) = 2 for Pt, 1 for Pd and Rh, room temperature, 2 min reaction time

| $Cu^{2+}$ Ion (ppm) | Cu Co-precipitated* (ppm) | | |
|---|---|---|---|
| | Pt | Pd | Rh |
| 25 | 14 | 21.3 | 14.7 |
| 50 | 7 | 23.4 | 7.7 |
| 100 | 17 | 32.5 | 7.2 |
| 250 | 36 | 38.7 | 15.3 |

*Difference in solution concentration after reduction

Figure 6:
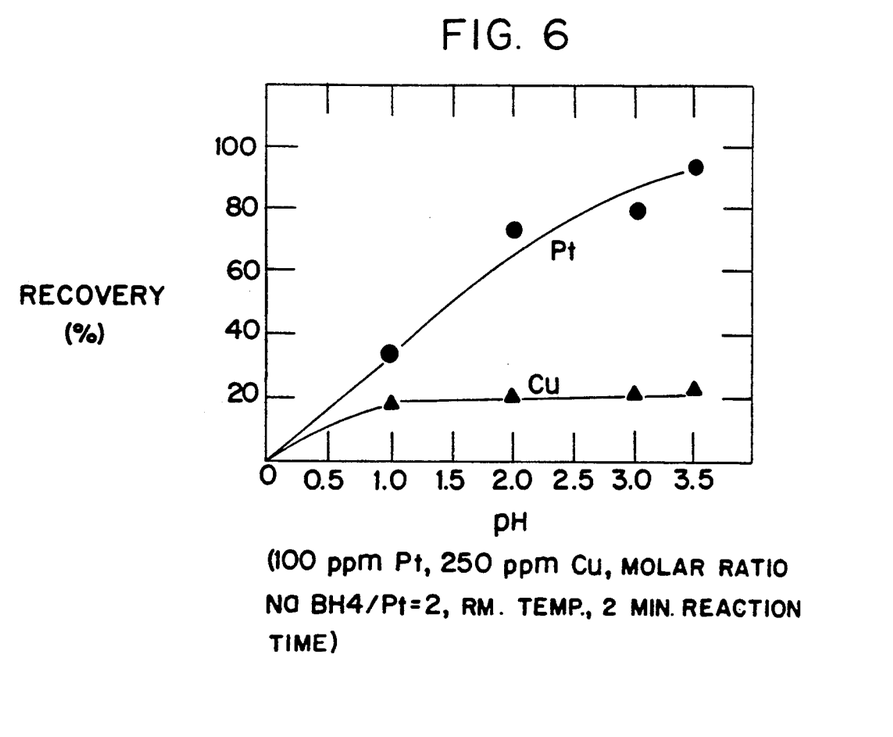
FIG. 6 shows the effect of pH on reduction of platinum chloro-complexes by sodium borohydride in the presence of copper.
Figure 7:
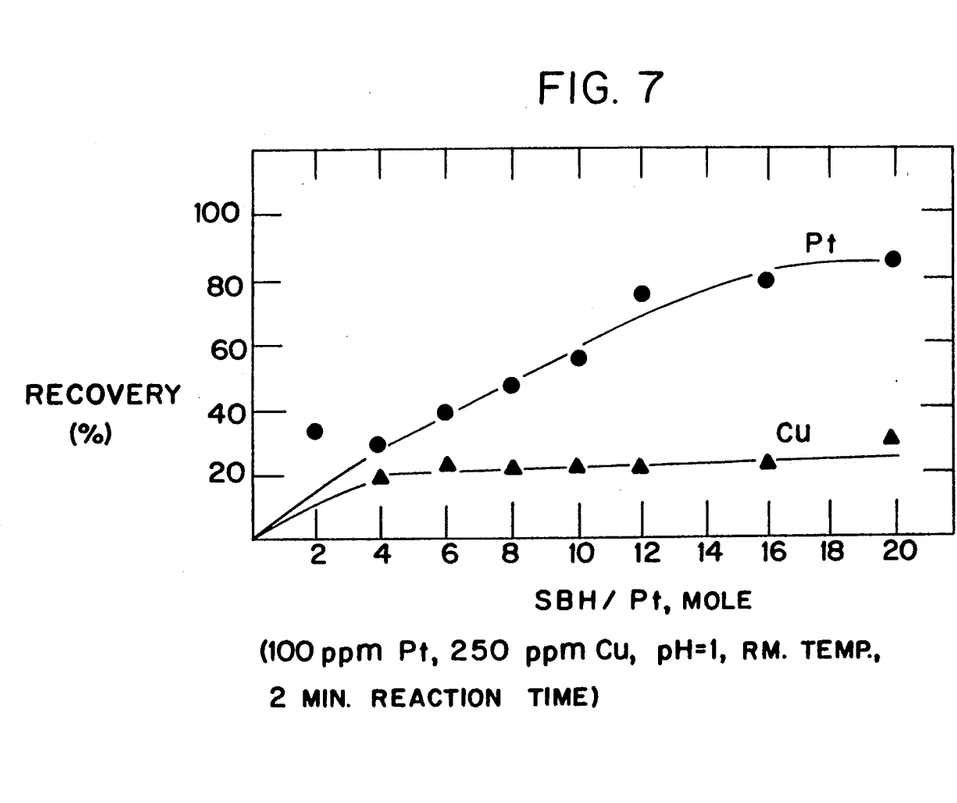
FIG. 7 shows the effect of NaBH₄/Pt molar ratio on reduction of platinum chloro-complexes by sodium borohydride in the presence of copper.

Copper ions act as an active catalyst for the hydrolysis of borohydride ion and rapidly liberate hydrogen before the complete reduction of PGM can take place. The negative effect of copper ions can be overcome by either a pH increase with the treated solutions or by an increase in the sodium borohydride/PGM molar ratio. This is illustrated for platinum in FIGS. 6 and 7. As can be seen in these figures, the amount of $Cu^{2+}$ ion which coprecipitates reaches a maximum value of about 20% of the original amount added to the Pt solution. The maximum is reached at a considerably lower pH or sodium borohydride/platinum mole ratio than where platinum recovery peaks.

When anions such $NO_3$ and $SO_4^{2-}$ were added in concentrations up to about 50 g/L to PGM-containing solutions, the reduction efficiency of sodium borohydride was found to be unaffected for Rh and Pd whereas a small decrease was observed for Pt as shown in Table 5.

TABLE 5

Effect of $NO_3^-$ and $SO_4^{2-}$ Ions on Reduction of PGM Chloro-complexes
100 ppm PGM, pH = 1, molar ratio (SBH/Metal) = 2 for Pt, 1 for Pd and Rh, room temperature, 2 min reation time

| $SO_4^{2-}$ or $NO_3^-$ conc. (g/L) | Pt Recovery (%) (in presence of) | | Pd Recovery (%) (in presence of) | | Rh Recovery (%) (in presence of) | |
|---|---|---|---|---|---|---|
| | $SO_4^{2-}$ | $NO_3^-$ | $SO_4^{2-}$ | $NO_3^-$ | $SO_4^{2-}$ | $NO_3^-$ |
| 0 | 84.8 | 84.8 | 99.79 | 99.70 | 99.97 | 99.97 |
| 10 | 68.4 | 78.0 | 98.76 | 98.88 | 99.96 | 99.60 |
| 25 | 66.4 | 79.0 | 98.65 | 98.65 | 99.16 | 99.40 |
| 50 | 67.3 | 70.0 | 98.03 | 98.56 | 98.00 | 98.50 |

The reduction of PGM by sodium borohydride was found to be greatly affected by the presence of thiourea in solution. Practically no reduction was obtained for 100 ppm PGM at pH=1.0 on adding an excess amount of sodium borohydride (sodium borohydride/metal ratio up to 6.0) in the presence of 3 grams thiourea/L. However, palladium reduction improved when the pH of a solution containing 3 g/L of thiourea, 100 ppm Pd, was increased using a molar ratio of sodium borohydride/Pd=3. As shown in Table 6, at a pH=2.5 complete reduction was obtained.

TABLE 6

Effect of pH on the Reduction of $Pd^{2+}$ in Presence of Thiourea
30 ppm Pd, thiourea = 3 g/L, molar ratio (SBH/Pd) = 3.0, room temperature, 2 min reaction time

| pH | Pd Recovery (%) |
|---|---|
| 1.0 | 0 |
| 1.5 | 9.3 |
| 2.0 | 13.8 |
| 2.5 | 99.6 |
| 3.0 | 98.0 |

Table 7 shows the effect of thiourea concentration on Pd reduction efficiency of sodium borohydride under otherwise favourable conditions. Thiourea concentration was found to have little effect below 30 g/L of thiourea. In contrast to palladium, reduction of platinum of thiourea solution was found to be possible only when an excess amount of sodium borohydride was used. This was due to the fact that it was not possible to reach the necessary pH level without precipitating platinum. For example, in a 1000 mg/L platinum solution containing 38 grams of thiourea/L reduction was only achieved at a sodium borohydride/platinum ratio of 12.0. In rhodium solution containing thiourea, reduction was found to be completely inhibited under any conditions of pH or excess sodium borohydride additions.

TABLE 7

Effect of Thiourea Concentration on Reduction of $Pd^{2+}$
30 ppm Pd, pH = 2.5, molar ratio (SBH/Pd) = 3.0, room temperature, 2 min reaction time

| Thiourea (g/L) | Pd Recovery (%) |
|---|---|
| 1 | 98.0 |
| 3 | 98.0 |
| 5 | 99.6 |
| 10 | 99.97 |
| 30 | 96.2 |
| 50 | 75.2 |

In thiocyanate solution, platinum reduction was also found to be adversely affected. For 500 mg/L PGM in the presence of 1 M thiocyanate ion, no reduction was obtained upon adding up to 0.2 mL sodium borohydride in the form of VenMet ™ solution ($NaBH_4/Pt^{2+}=2.5$) at pH=1.0. Upon addition of a further 0.2 mL, the pH increased to 9.0 but only about 14% of the platinum was recovered.

It appears that sodium borohydride loses its reducing power for PGM in the presence of thiourea and thiocyanate because these anions strongly complex PGM. Accordingly, the sodium borohydride reduction reaction is blocked.

Actual PGM-containing solutions obtained from the Royal Canadian Mint, Ortech International and Noranda Inc. were used to evaluate the effectiveness of the sodium borohydride reduction method. The solution from the Royal Canadian Mint was a sample of spent gold chloride electrolyte from which the gold had been removed by treatment with sulphur dioxide. Noranda Inc. provided a high acid containing (8N HCl) palladium strip solution from a solvent extraction circuit. The sample from Ortech International was produced by chloride leaching of spent automobile exhaust catalyst.

Fifty milliliters of each solution was treated with sodium borohydride in the form of VenMet ™ solution, added dropwise, over a 3 to 15 minute time period while agitating the solution with a magnetic stirrer. The reaction was conducted at room temperature. Completion of the reaction was indicated by the formation of a colorless solution.

Precipitates, in the form of black agglomerates, were immediately produced. They were readily separated by filtration or decantation.

As shown in Table 8, the amount of platinum and palladium recovered from the Royal Mint solution at pH (−0.08) increased with the addition of increased amounts of stabilized sodium borohydride. Increasing the initial pH of the solution to 1.0 allowed complete recovery of platinum, palladium and copper ions with the addition of 0.5 mL of sodium borohydride in the form of VenMet ™ solution to 50 mL of PGM solution.

TABLE 8

Precipitation of Pt and Pd from Royal Mint Solution
Feed: 2277 ppm Pt, 915 ppm Pd, 2.0 g Cu/L initial pH = 0.08, 5 min reaction time

| VenMet Solution (mL) | Recovery (%) | | | Product Purity (%) | | |
|---|---|---|---|---|---|---|
| | Pt | Pd | Cu | Pt | Pd | Cu |
| 0.1 | 17.9 | 32.8 | 1.2 | 55.7 | 41.1 | 3.2 |
| 0.2 | 20.3 | 38.3 | 7.4 | 48.1 | 36.5 | 15.4 |
| 0.3 | 16.7 | 49.1 | 8.4 | 46.3 | 45.0 | 16.8 |

TABLE 8-continued

Precipitation of Pt and Pd from Royal Mint Solution
Feed: 2277 ppm Pt, 915 ppm Pd, 2.0 g Cu/L initial pH = 0.08, 5 min reaction time

| VenMet Solution (mL) | Recovery (%) | | | Product Purity (%) | | |
|---|---|---|---|---|---|---|
| | Pt | Pd | Cu | Pt | Pd | Cu |
| 0.5 | 35.0 | 88.4 | 21.1 | 39.3 | 39.9 | 20.8 |
| 0.7 | 57.0 | 98.7 | 38.3 | 43.8 | 30.4 | 25.8 |

Table 9 shows the results of the precipitation of PGM from the Ortech International solution. At the original pH of the feed sample, the amount of stabilized sodium borohydride required to achieve 97% palladium, 90% platinum and 9% rhodium recovery with about 10% Pb coprecipitation was 0.2 mL sodium borohydride in the form of VenMet TM solution per 50 mL feed solution. It was found that the stabilized sodium borohydride solution requirement could be halved by adjusting the initial pH of the PGM feed solution to approximately 2.0.

TABLE 9

Precipitation of PGM from Ortech Solutions
Feed: 243.3 ppm Pt, 196.6 ppm Pd, 11.1 ppm Rh, 1726 ppm Pb, 9650 ppm Al, 15 min reaction time

| Initial pH | VenMet Sol'n (mL) | Recovery (%) | | | | Product Purity (%) | | | |
|---|---|---|---|---|---|---|---|---|---|
| | | Pt | Pd | Rh | Pb | Pt | Pd | Rh | Pb |
| 0.86 | 0.25 | 88.7 | 96.7 | 9.1 | 8.5 | 38.4 | 33.8 | 1.6 | 26.1 |
| 0.86 | 0.20 | 89.1 | 96.7 | 9.2 | 10.2 | 36.6 | 32.1 | 1.5 | 24.7 |
| 1.10 | 0.20 | 89.7 | 96.7 | 9.3 | 8.9 | 38.2 | 33.3 | 1.6 | 32/3 |
| 1.72 | 0.15 | 90.0 | 96.7 | 9.2 | 11.6 | 35.4 | 30.7 | 1.5 | 32.3 |
| 2.00 | 0.10 | 90.7 | 96.7 | 9.2 | 9.8 | 37.5 | 32.2 | 1.6 | 37.0 |

Results obtained with synthetic solutions indicated that palladium recovery was relatively insensitive to solution pH. This result was confirmed with the substantially complete recovery of PGM from the Noranda Inc. palladium strip liquor sample treated at its original acidity (8N HCl) with 0.5 mL sodium borohydride in the form of VenMet TM solution to 50 mL of feed solution. The initial concentrations in the feed solution were 12.67 g palladium per litre, 32.3 ppm platinum and 75 ppm copper, which resulted in recoveries of 99.9% palladium, 89.5% platinum and 99.7% copper. Purity of the product obtained was 99.2% palladium, 0.2% platinum and 0.6% copper.

Figure 8:
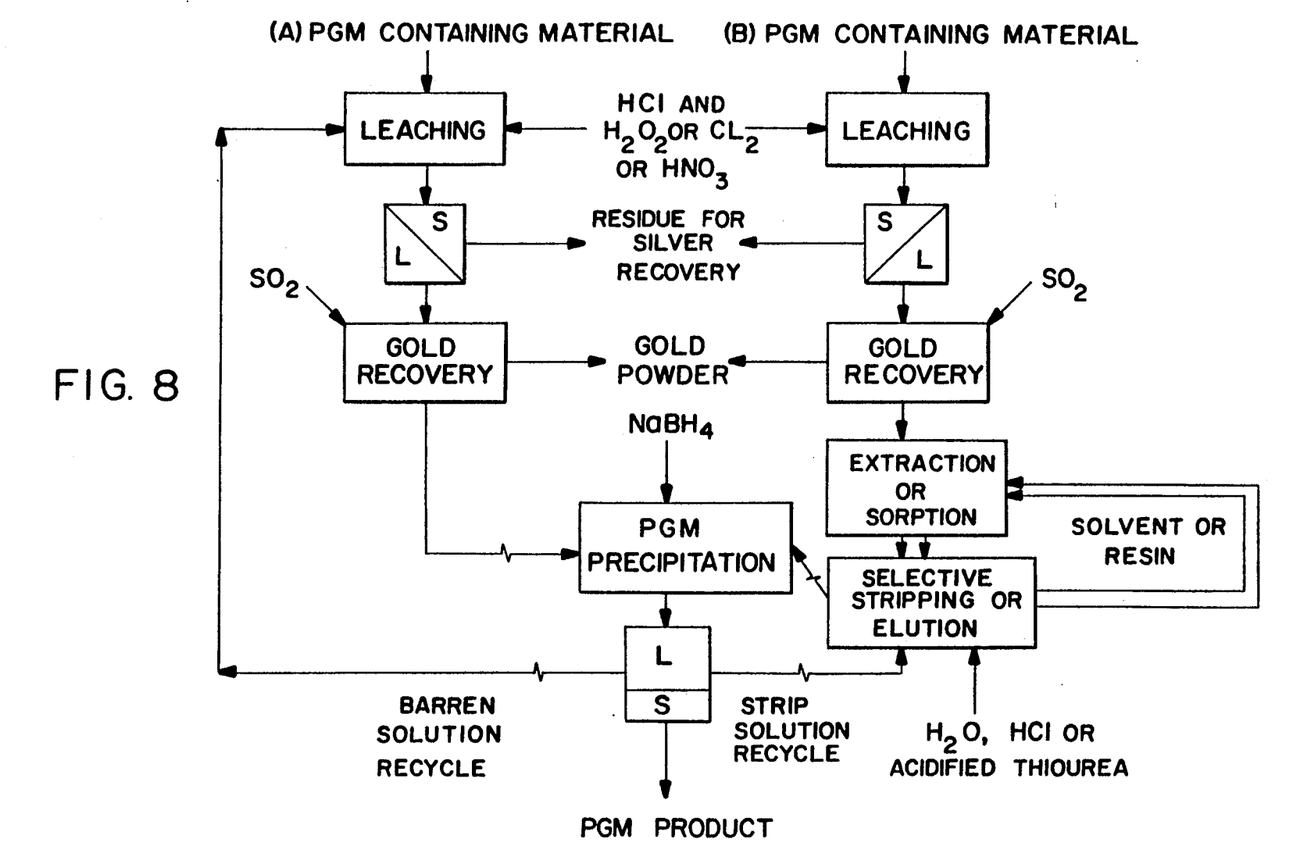
FIG. 8 shows a process flowsheet of two alternate leaching methods incorporating therein a recovery step embodying the invention.

In the embodiment shown in FIG. 8(A), a PGM-containing material is conventionally leached by concentrated HCl with $Cl_2$, $H_2O_2$ or $HNO_3$ as oxidizing agent. The solid residue is separated from the leach solution for silver recovery. The aqueous leach liquor is then treated with sulphur dioxide gas to recover gold by selective precipitation leaving a PGM-bearing solution. This solution is then treated with sodium borohydride to recover PGM by reduction precipitation. The PGM precipitate is readily separated from solution by filtration to produce a high purity PGM powder. The barren solution is such that it can be recycled to the upstream process.

In the embodiment shown in FIG. 8(B), PGM-containing material is HCl acid leached with $H_2O_2$, $Cl_2$, or $HNO_3$ as oxidizing agent. After the solid residue has been separated for silver recovery, the aqueous leach solution is treated with sulphur dioxide gas. Gold powder forms and is separated. The platinum group metals are then concentrated by extraction from the leach solution by an organic solvent or sorption on ion exchange resin. The loaded organic phase (or resin) is selectively stripped (or eluted) using water, various strengths of HCl, or acidified thiourea solution to produce a rich aqueous stream of platinum group metals. The PGM-containing solution is then reduced with sodium borohydride to precipitate a high purity PGM powder which is readily separated by filtration. The barren solution is recycled to the PGM concentrating stage.

For the determination of the various parameters involved and for testing the process in general, most experimentation was effected in 250 mL beakers containing 100 mL of solution comprising 100 mg/L PGM in chloride media at pH=1 and at ambient temperature and pressure. The solution was agitated gently by a magnetic stirrer.

Kinetic studies were performed on 1 litre of test solution. Samples were withdrawn at periodic time intervals, filtered and analyzed for the desired metals by AAS (atomic absorption spectrophotometry). When a mixture of platinum and palladium solution was analyzed, a lanthanum buffer solution was added to both standards and the test solutions to avoid interference. The effect of temperature was examined in a similar manner; 250 mL conical plastic flasks (rather than glass beakers) were agitated in a temperature-controlled shaker-bath. The reaction time in most cases was two minutes.

The following example further illustrates the invention.

EXAMPLE

A PGM-containing solution analyzed as containing: 800 ppm Pd, 40 ppm Pt, 40 ppm Pb, 160 ppm Al and 10 ppm Zn ions in 50 g/L thiourea was treated. To 50 mL of this solution, 0.2 mL of sodium borohydride in the form of VenMet TM solution was added after adjusting the pH to about 1.5 with NaOH. A black precipitate formed immediately upon the addition of the stabilized $NaBH_4$. The precipitate was removed by filtration and the barren solution was analyzed as containing 7.5 ppm Pt, 2.0 ppm Pd, 1.28 ppm Pb, 160 ppm Al and 10 ppm Zn. Accordingly, recovery was 81.3% Pt, 99.8% Pd and 95.0% Pb. The product purity was determined as 3.7% Pt, 91.9% Pd and 4.4% Pb.

We claim:

1. A method for the direct recovery of a platinum group metal (PGM) from a highly acidic aqueous solution resulting from the acid leaching of precious metal bearing material, which comprises adding stabilized alkali metal borohydride to the solution at ambient temperature and pressure to effect reduction precipitation of the PGM from solution, separating the precipitated platinum group metal values from the residual solution by filtration, and optionally recycling the barren aqueous solution to the upstream process.

2. A method for the direct recovery of platinum group metals (PGM) from thiourea solution, which comprises adding stabilized alkali metal borohydride to the solution at ambient temperature and pressure to effect reduction precipitation of the PGM from solution, separating the precipitated platinum group metal values from the residual solution by filtration, and optionally recycling the barren aqueous solution to the upstream process.

3. A method for the direct recovery of precious metals selected from the group consisting of platinum group metals (PGM), silver and gold from a precious metals containing material, which comprises: a) subjecting the material to acid leaching and separating the resultant solid residue for silver recovery; b) subjecting the acid leach liquor to sulphur dioxide treatment and separating the resultant precipitated gold powder; c) treating the resultant aqueous solution with stabilized alkali metal borohydride and separating precipitated platinum group metals therefrom; and optionally d) recycling the barren solution to the 4. A method for the direct recovery of precious metals selected from the group consisting of platinum group metals (PGM), silver and gold from a precious metals containing material, which comprises: a) subjecting the material to acid leaching and separating the resultant solid residue for silver recovery; b) subjecting the acid leach liquor to sulphur dioxide treatment and separating the resultant precipitated gold powder; c) concentrating the resultant PGM-containing aqueous solution by extraction with an organic solvent or sorption by a resin; d) producing an enriched PGM-containing aqueous stream by selective stripping or elution; e) treating the resultant aqueous solution with stabilized alkali metal borohydride and separating precipitated platinum group metals therefrom; and optionally f) recycling the barren solution to the concentrating stage.

5. A method as claimed in claim 1, wherein the alkali metal borohydride used is stabilized sodium or potassium borohydride.

6. A method as claimed in claim 2, wherein the alkali metal borohydride used is stabilized sodium or potassium borohydride.

7. A method as claimed in claim 3 wherein the alkali metal borohydride used is stabilized sodium or potassium borohydride.

8. A method as claimed in claim 4, wherein the alkali metal borohydride used is stabilized sodium or potassium borohydride.

9. A method as claimed in claim 1, wherein the alkali metal borohydride used is a stabilized sodium borohydride solution containing about 12% by weight of sodium borohydride and 10 to 50% by weight of sodium hydroxide.

10. A method as claimed in claim 2, wherein the alkali metal borohydride used is a stabilized sodium borohydride in the form of an aqueous sodium borohydride/sodium hydroxide solution containing about 12% sodium borohydride and 10 to 50% sodium hydroxide.

11. A method as claimed in claim 3 wherein the alkali metal borohydride used is a stabilized sodium borohydride in the form of an aqueous sodium borohydride/sodium hydroxide solution containing about 12% sodium borohydride and 10 to 50% sodium hydroxide.

12. A method as claimed in claim 4, wherein the alkali metal borohydride used is a stabilized sodium borohydride in the form of an aqueous sodium borohydride/sodium hydroxide solution containing about 12% sodium borohydride and 10 to 50% sodium hydroxide.

13. A method as claimed in claim 1, wherein the alkali metal borohydride used is a stabilized aqueous sodium borohydride solution containing about 12% by weight of sodium borohydride and about 40% by weight of sodium hydroxide.

14. A method as claimed in claim 2, wherein the alkali metal borohydride used is stabilized aqueous sodium borohydride solution containing about 12% by weight of sodium borohydride and about 40% by weight of sodium hydroxide.

15. A method as claimed in claim 3 wherein the alkali metal borohydride used is stabilized aqueous sodium borohydride solution containing about 12% by weight of sodium borohydride and about 40% by weight of sodium hydroxide.

16. A method as claimed in claim 4, wherein the alkali metal borohydride used is stabilized aqueous sodium borohydride solution containing about 12% by weight of sodium borohydride and about 40% by weight of sodium hydroxide.

17. A method for the direct recovery of platinum group metals (PGM) as claimed in claim 2, wherein the thiourea solution originates from the thiourea leaching of precious metal bearing material.

18. A method for the direct recovery of precious metals as claimed in claim 3, wherein hydrochloric acid is the leaching agent and $H_2O_2$, $Cl_2$ or $HNO_3$ is the oxidizing agent.

19. A method for the direct recovery of precious metals as claimed in claim 4, wherein hydrochloric acid is the leaching agent and $H_2O_2$, $Cl_2$ or $HNO_3$ is the oxidizing agent.

20. A method for the direct recovery of precious metals as claimed in claim 4, wherein the stripping or elution step is effected with water, HCl or acidified thiourea solution.

21. A method for the direct recovery of platinum group metals (PGM) as claimed in claim 1, wherein the highly acidic solution also contains any of aluminum, zinc, lead, sulphate, nitrate or copper ions.

22. A method for the direct recovery of platinum group metals (PGM) as claimed in claim 2, wherein the thiourea solution also contains any of aluminum, zinc, lead, sulphate, nitrate or copper ions.

23. A method for the direct recovery of platinum group metals (PGM) as claimed in claim 17, wherein the thiourea solution also contains any of aluminum, zinc, lead, sulphate, nitrate or copper ions.

24. A method for the direct recovery of platinum group metals (PGM) as claimed in claim 1, wherein the solution to be treated contains platinum group metals in the concentration range of from about 10 ppm to several grams per litre.

25. A method for the direct recovery of platinum group metals (PGM) as claimed in claim 2, wherein the solution to be treated contains platinum group metals in the concentration range of from about 10 ppm to several grams per litre.

26. A method as claimed in claim 1, wherein the pH value of the highly acidic solution is less than or equal to about 2.

* * * * *